(12) United States Patent
Glazer et al.

(10) Patent No.: US 8,589,255 B2
(45) Date of Patent: *Nov. 19, 2013

(54) VIRTUAL REALITY SHOPPING EXPERIENCE

(71) Applicant: American Express Travel Related Services Company, Inc., New York, NY (US)

(72) Inventors: Elliott Glazer, Chesterfield, VA (US); Carol Lee Hobson, New River, AZ (US); Elizabeth S. Deming, Brooklyn, NY (US); Coby Royer, University City, MO (US); Jeff S. Fehlhaber, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,020

(22) Filed: Nov. 6, 2012

(65) Prior Publication Data

US 2013/0066751 A1    Mar. 14, 2013

Related U.S. Application Data

(63) Continuation of application No. 13/273,128, filed on Oct. 13, 2011, now Pat. No. 8,326,704, which is a continuation of application No. 12/693,294, filed on Jan. 25, 2010, now Pat. No. 8,069,095, which is a continuation of application No. 10/800,413, filed on Mar. 11, 2004, now Pat. No. 7,680,694.

(51) Int. Cl.
*G06Q 30/00*    (2012.01)

(52) U.S. Cl.
USPC .... 705/27.1; 705/26.1; 705/26.41; 705/26.44

(58) Field of Classification Search
USPC .............................................. 705/26.1–27.2
See application file for complete search history.

(56) References Cited

U.S. PATENT DOCUMENTS

| | | | |
|---|---|---|---|
| 5,737,533 A | 4/1998 | de Hond | |
| 5,848,399 A | 12/1998 | Burke | |
| 5,930,769 A | 7/1999 | Rose | |
| 5,946,665 A | 8/1999 | Suzuki et al. | |

(Continued)

OTHER PUBLICATIONS

"Desktop Discount Shopping, The Newest Perquisite" David Leonhardt, New York Times. Nov. 17, 1999. p. G1.*

(Continued)

*Primary Examiner* — Michael Misiaszek
(74) *Attorney, Agent, or Firm* — Snell & Wilmer L.L.P.

(57) ABSTRACT

A solution is provided for a method for a user to shop online in a three dimensional (3D) virtual reality (VR) setting by receiving a request at a shopping server to view a shopping location, having at least one store, and displaying the shopping location to the user's computer in a 3D interactive simulation view via a web browser to emulate a real-life shopping experience for the user. The server then obtains a request to enter into one of the stores and displays the store website to the user in the same web browser. The store website has one or more enhanced VR features. The server then receives a request to view at least one product and the product is presented in a 3D interactive simulation view to emulate a real-life viewing of the product.

20 Claims, 12 Drawing Sheets

(56) References Cited

U.S. PATENT DOCUMENTS

| | | |
|---|---|---|
| 5,950,173 A | 9/1999 | Perkowski |
| 5,963,916 A | 10/1999 | Kaplan |
| 5,999,915 A | 12/1999 | Nahan et al. |
| 6,026,377 A | 2/2000 | Burke |
| 6,041,123 A | 3/2000 | Colvin, Sr. |
| 6,058,373 A | 5/2000 | Blinn et al. |
| 6,070,149 A | 5/2000 | Tavor et al. |
| 6,091,417 A | 7/2000 | Lefkowitz |
| 6,101,482 A | 8/2000 | DiAngelo et al. |
| 6,115,045 A | 9/2000 | Miyauchi |
| 6,125,353 A | 9/2000 | Yagasaki |
| 7,349,867 B2 | 3/2008 | Rollins et al. |
| 2001/0044751 A1 | 11/2001 | Pugliese et al. |
| 2002/0026380 A1 | 2/2002 | Su |
| 2002/0072993 A1 | 6/2002 | Sandus et al. |
| 2003/0033205 A1 | 2/2003 | Nowers et al. |
| 2003/0069832 A1 | 4/2003 | Czepluch |
| 2003/0083957 A1 | 5/2003 | Olefson |
| 2003/0154135 A1 | 8/2003 | Covington et al. |
| 2003/0195818 A1 | 10/2003 | Howell et al. |
| 2005/0075940 A1 | 4/2005 | DeAngelis |

OTHER PUBLICATIONS

Leonhardt, "Desktop Discount Shopping, The Newest Prerequisite," New Yotk Times, Nov. 17, 1999, g.G.1, Retreived via ProWuest on Aug. 1, 2011.

USPTO; All Office Actions (Non-Final, Final, Advisory Actions, Restrictions/Elections, etc.), Notices of Allowance, 892s, 1449s and SB/08As from U.S. Appl. Nos. 12/693,294; 10/800,413.

USPTO; Office Action dated Jan. 6, 2012 in U.S. Appl. No. 13/273,128.

USPTO; Notice of Allowance dated Aug. 1, 2012 in U.S. Appl. No. 13/273,128.

* cited by examiner

VIRTUAL REALITY SHOPPING EXPERIENCE

CROSS-REFERENCE TO RELATED APPLICATIONS

This application is a continuation of, claims priority to and the benefit of, U.S. Ser. No. 13/273,128 filed on Oct. 13, 2011 and entitled "VIRTUAL REALITY SHOPPING EXPERIENCE." The '128 application is a continuation of, claims priority to and the benefit of, U.S. Pat. No. 8,069,095 issued on Nov. 29, 2011 (aka U.S. Ser. No. 12/693,294 filed on Jan. 25, 2010) and entitled "VIRTUAL REALITY SHOPPING EXPERIENCE." The '095 patent is a continuation of, claims priority to and the benefit of, U.S. Pat. No. 7,680,694 issued on Mar. 16, 2010 (aka U.S. Ser. No. 10/800,413 filed on Mar. 11, 2004) and entitled "METHOD AND APPARATUS FOR A USER TO SHOP ONLINE IN A THREE DIMENSIONAL VIRTUAL REALITY SETTING." All of which are hereby incorporated by reference.

FIELD OF THE INVENTION

The present invention relates to virtual reality. More particularly, the present invention relates to a realistic three dimensional virtual reality shopping experience.

BACKGROUND OF THE INVENTION

In the past, consumers were required to physically visit stores and shopping malls to purchase products. Currently, with the expanding use of the Internet and World Wide Web, there are many web pages allowing users to browse and purchase merchandise without ever leaving the computer terminal. For consumers who dislike shopping, are limited in time, live in rural areas where shopping is limited, or for some reason cannot physically visit the mall or store, shopping online is an ideal way to purchase products.

Mail order catalogs and television shopping channels have attempted to address this need in the past. However, mail order catalogs are limited in their shopping choices and television shopping channels are not readily available in every city and/or consumers do not have control over what items are viewed to buy.

There is an increased presence of three dimensional (3D) virtual worlds on the Internet, described using a virtual reality modeling language (VRML). VRML is based on certain types of polygons defined by a set of parameters. However, the interaction with remote virtual environments on the Internet is still extremely limited. One common approach is to first download the entire VRML 3D world to the client. Then the client renders the scene locally. This approach is successful as long as the environment is not too complex; otherwise it causes a critical penalty in the downloading time. This prevents the use of photo-textures, which are necessary for a photo-realistic impression. It should be emphasized that the downloading time is required for every change of session, for example, if the user moves to an upper floor in a shopping application or to another planet in a video game.

Furthermore, a user may have to connect to each store's web page to shop at the store. This requires the user to open a new browser each time, which takes time and space on the computer. Thus, there is a need for a way to enhance a user's shopping experience to make shopping online more efficient and appealing.

BRIEF DESCRIPTION OF THE INVENTION

A solution is provided for a method for a user to shop online in a three dimensional (3D) virtual reality (VR) setting by receiving a request at a shopping server to view a shopping location, having at least one store, and displaying the shopping location to the user's computer in a 3D interactive simulation view via a web browser to emulate a real-life shopping experience for the user. The server then obtains a request to enter into one of the stores and displays the store website to the user in the same web browser. The store website has one or more enhanced VR features. The server then receives a request to view at least one product and the product is presented in a 3D interactive simulation view to emulate a real-life viewing of the product.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of virtual reality shopping experience. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hard-wired devices, field programmable gate arrays (FPGAs), application specific integrated circuits (ASICs), or the like, may also be used without departing from the scope and spirit of the inventive concepts disclosed herein.

The present invention relates to a realistic three-dimensional (3D) virtual reality shopping experience. Most shopping web pages are two dimensional and do not allow a user to experience an actual shopping experience. By allowing a user to shop online in a 3D virtual world environment, the shopping experience would be enhanced. A user will be able to shop at a variety of stores without having to physically visit the stores, will be able to view the store front as well as inside the store itself, and will be able to view the product in 3D prior to purchasing the product. Moreover, virtual reality uses any or all senses to create a virtual world, which may be a model of a real world or a wholly artificial one. Additionally, the experience may be rendered interactive by any special human interface device(s) used today.

Figure 1:
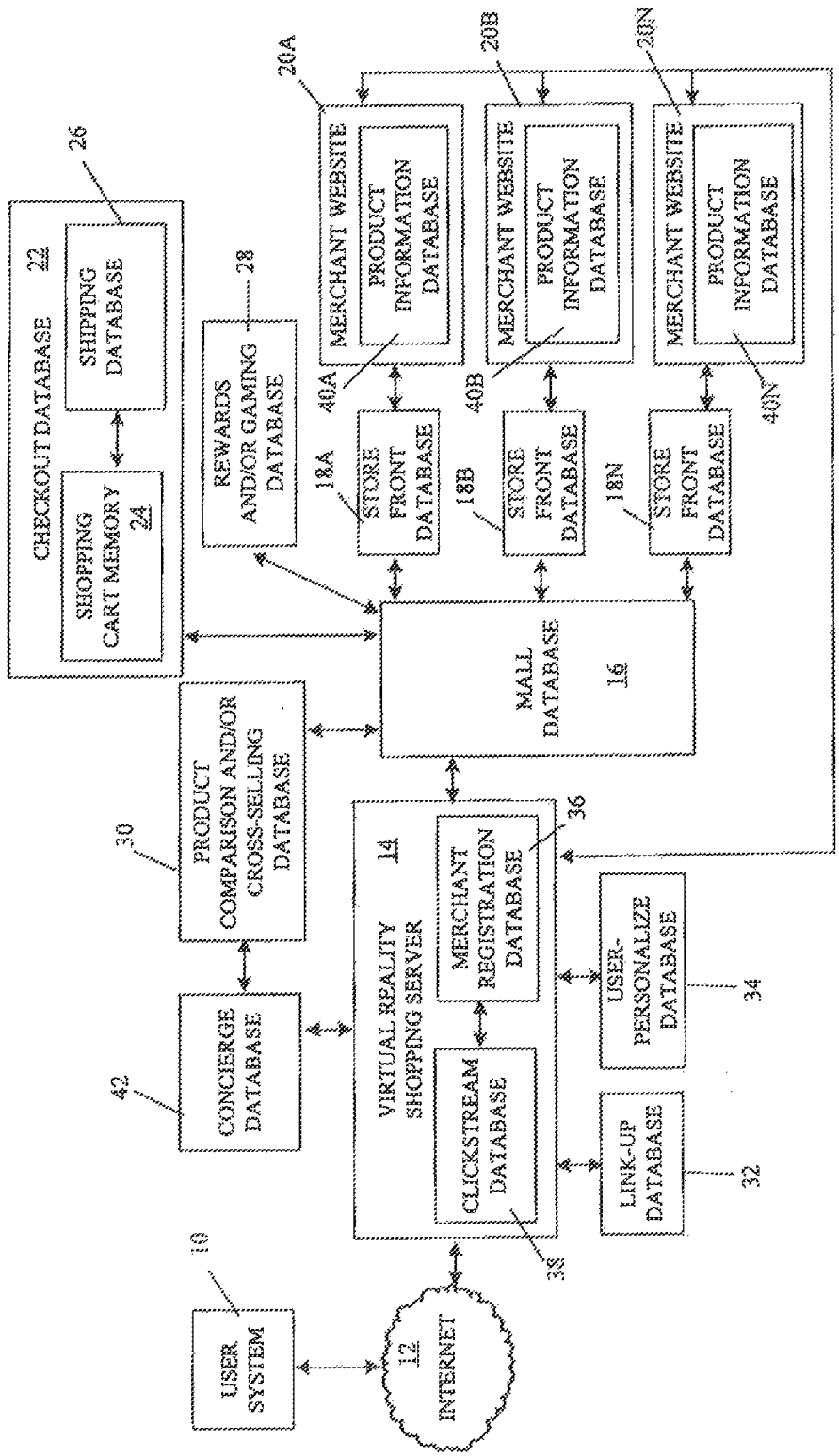
FIG. 1 a block diagram illustrating the virtual reality shopping experience in accordance with an embodiment of the present invention.

FIG. 1 a block diagram illustrating the virtual reality shopping experience in accordance with an embodiment of the present invention. The user system 10, such as a computer, may connect to the Internet 12 or other media through an HTTP or wireless browser. The Internet 12 may then connect to a virtual reality shopping server 14 to send virtual reality contents to the user browser to provide a 3D virtual reality shopping experience. The shopping server 14 may contain a merchant registration database 36 of store information having imaging and virtual reality data that is used for rendering the merchant's store front in the virtual reality enabled browser as described below. The shopping server 14 may also contain a clickstream database 38 to semantically collect data that identifies the user actions with the virtual world. The data may be used to determine which products may be of interest to the user for automated product cross-selling as described below. The clickstream database 38 may also be connected to the merchant website 20a, 20b, 20n to allow the merchants to internally dynamically target and cross-sell products through changing their banner, store front, offers, customize sorting of their products, and the like.

A mall database 16 may be connected to the shopping server 14. The mall database 16 may contain virtual reality content for an existing mall or a virtual mall. The mall database 16 may be connected to each merchant's store front 18a, 18b, 18n (where n is an integer) which is connected to each respective merchant's website 20a, 20b, 20n. The user may be directed to the virtual reality enhanced portions or features of the merchant's website 20a, 20b, 20n by clicking the merchant's store front within the mall. The merchant's website 20a, 20b, 20n may have a product information database 40a, 40b, 40n. The product information database may contain data about merchandise the store sells to display a product information sheet to the user. The product information sheet may contain information about the product materials, cost, ingredients, country of origin, special product features, and the like.

The mall database 16 may be connected to a checkout database 22 as described below. The checkout database 22 may have a shopping cart memory 24 to "hold" the user's merchandise. The checkout database 22 may also have a shipping database 26 to track the user's purchases when shipped to the user.

To enhance and provide for a more efficient shopping experience, the mall database 16 may be connected to a rewards and/or gaming database 28 and a product comparison and/or cross-selling database 30. The rewards and/or gaming database 28 allows the user to play games by applying the games to the business processes associated with shopping for both the shoppers and non-shoppers as further described below. The comparison and/or cross-selling database 30 allows for a more efficient shopping experience by providing price or product comparisons to the user as well as similar product information as will be further discussed below.

The shopping server 14 may be connected to a link-up database 32, which allow multiple users to link up for a social shopping experience as described below. The shopping server 14 may also be connected to a personalized database 34 to allow the user to personalize the mall to the user's desires. A concierge database 42 may also be connected to the shopping server 14 as described below.

To provide an enhanced shopping experience, the virtual reality world may utilize any or all human senses. Sight is used to view the projections, computer screen and other objects. Sight may be utilized through the use of different perspectives such as through the user's sight, from above or below, or from a perspective view. Non-realistic mappings from the virtual world to the intrinsically two dimensional presentation of common art computer monitors is also possible. Sound, typically polyphonic, is used to recreate spatial perception. Motion may require a variety of motion simulators where the user has the perception of being contained in a simulator. The sense of touch may be projected through the tactile sensor devices such as a vibrating mouse, pressure generating devices, and the like. The sense of smell may also be possible through the use of special instrumentation that releases controlled quantities of specific volatile chemicals. Touch may also be used in the future to allow the user to feel the products. The use of all the senses in a virtual reality world would enhance the shopping experience for the user.

The user may interact within the virtual reality world through a variety of means. For example, a keyboard, a mouse, voice activation, a joy stick, and the like. Human interaction may also be accomplished through motion such as with the use of a video camera to measure the gestures of a user for display to the server, motion gloves, and the like.

Travel to Mall

Once connected to the shipping server, the shopper's virtual reality shopping experience may begin with navigating to a shopping mall or store. There have been many attempts to provide 3D navigation, but most use two dimensional projections of 3D augmented by java script "on mouse" images and using image maps for further interaction. However, the present invention provides the user with an actual 3D virtual reality experience through a server side software which sends virtual reality content to the user's browser. This avoids having the user download the entire VRML 3D world onto the client's computer. One type of software may allow for the streams of 3D content to be sent over the Internet and may scale the resolution for optimal performance on the computer or connection speed. The primary component of the technology may be a browser plug-in that allows online consumers to interact with a virtual product on a e-commerce site as if they were in the store. The program may also allow for hyper-realistic rendering, with physically correct lighting, reflections, and shadows to provide accurate visualization of the objects. It may also employ a combination of wavelet technology and procedural textures and materials that produce dramatically smaller files comparable in quality to two dimensional image formats. Thus, the consumer's experience is faster and more enjoyable.

Through the user's prospective, the user may be in a vehicle, such as a car, bus, trolley, airplane and the like. The vehicle would allow the user to traverse through roads or highways, similar to if the user were to physically drive to the store. The type and model of vehicle may vary and music, which may or may not be selected by the user, may be playing in the background. There may be signs along the road to direct the user to different mails, such as the Mall of America in Minneapolis, or any virtual mall. Alternatively, the user may be able to traverse a map of the United States, the world, or a virtual world to locate and navigate to different malls or stores. In another alternative, the user may traverse a graph, such as a directed graph or digraph, where the nodes correspond to locations in the world or virtual world. The arcs of the graph may depict highways and the user may select arcs when traversing paths between nodes. The graph may even be a bipartite graph whereby different nodes also represent junctions in roads.

Entering Mall

Once the user has chosen a certain mall or store to visit, the vehicle drives to the mall or store and the user exits the car and enters the mall or store. The virtual reality experience may be enhanced by viewing the user exiting the vehicle, closing and locking the vehicle door, locking the car door, and walking and entering the mall or store. The following description will describe the user entering a mall, however, the same description may apply to a certain store the user would like to shop. The mall may be a famous mall, such as the Mall of America, a mall organized by targeted consumer groups, or a virtual mall with a variety of stores. Within the mall itself, the stores may also be organized by targeted groups, alphabetically by store name, by categories, by floor, wings, or other means. The stores may also be organized by offers, or rewards such as stores that will give frequent flyer rewards for a specific airline.

Figure 2A:
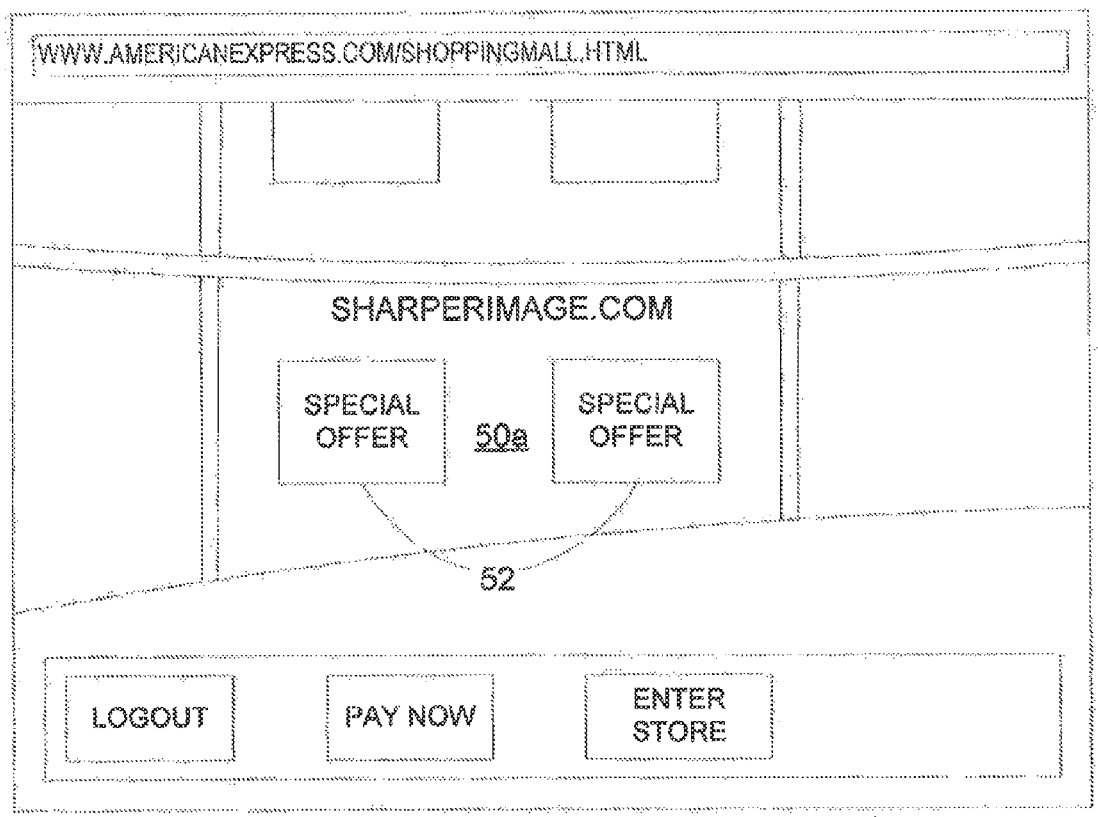
FIGS. 2A and 2B are screen shots illustrating an exemplary mall in accordance with an embodiment of the present invention.
Figure 2B:
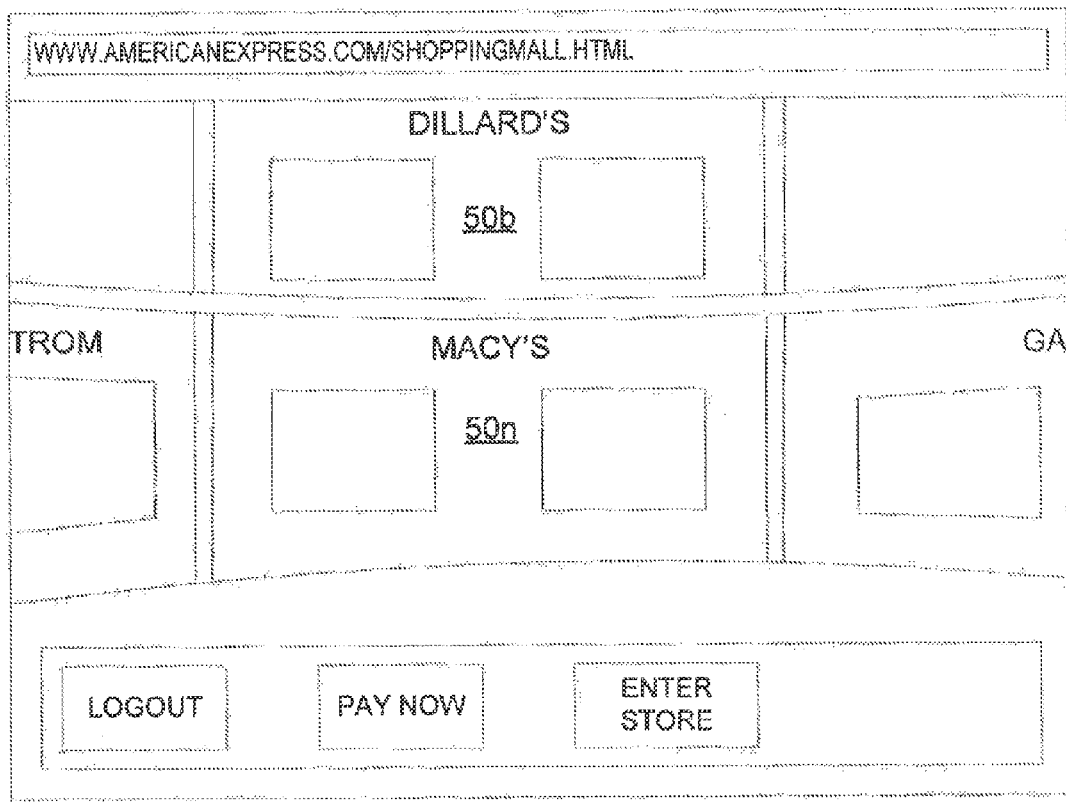

However structured, the mall may be configured in any manner to look like a shopping mall with escalators, elevators, chairs, plants, help booths, direction signs, plants, kiosks and exhibits. A directory may be presented to show the user the layout of the mall and the location of stores. The directory may also support navigation through the mall where the user may be instantly transported to the front of a desired store by clicking the store on the directory, or perhaps via other interfaces such as voice recognition. For exemplary purposes only and not intended to be limiting, FIGS. 2A and 2B are screen shots illustrating an exemplary mall in accordance with an embodiment of the present invention. The mall may be viewed as a cylindrical geometry wherein the store fronts 50a, 50b, 50n are arranged in horizontal layers (i.e. floors) facing toward the center line of the cylinder. In this example, the stores may be categorized by floors. The user's prospective may rotate left and right (horizontal plane) and translate (move in a straight line) vertically to view the store fronts 50a, 50b, 50n.

Entering Store Fronts

Each merchant will have the ability to manage their store front 50a, 50b, 50n (FIGS. 2A and 2B) similar to how they would manage their actual store front in a real mall. The merchant may be required to register before placing a store front in the virtual mall and placing messages, ads, and/or displays. The shopping server 14 may contain a merchant registration database 36 of store information having imaging and virtual reality data that is used for rendering the store front in the virtual reality enabled browser. The merchant may have the ability to select images, sounds, animations, touch, and scripted virtual reality interaction with the store front using a variety of virtual reality elements and virtual world objects such as manikins, marquis and other signs, rotating displays with merchandises or other objects, and interactive displays. Product demonstrations may be presented, and if scent enabled, the user may smell perfumes, floral scents, or gastronomical scents such as for a gourmet store. Clickstream data may also be requested.

Merchants may register and be billed in a variety of ways. For example, the merchant may be billed a recurring subscription fee and/or fees per merchant site request. In another example, the merchant may be charged a basic fee and charged a percentage of each product sold. In yet another example, the merchant may be billed based upon the number of merchant products available through the mall, such as fixed cost for up to 1000 products or per box. Additionally, merchants may be charged an extra fee for additional services such as support for the ability of a user to smell products, ability for a user to interact with non-standard interne devices such as flight simulator equipment or heath monitoring devices, and the like.

Figure 3A:
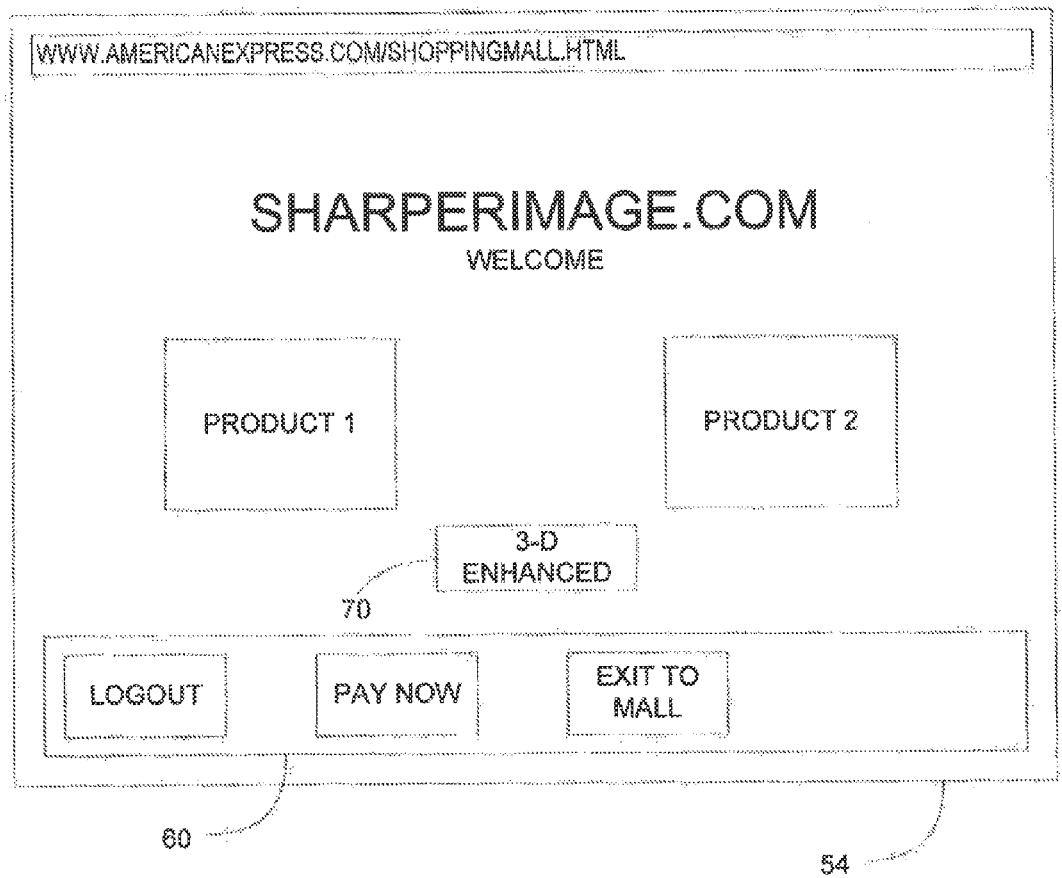
FIGS. 3A, 3B, 3C, and 3D are screen shots illustrating inside a merchant store front in accordance with an embodiment of the present invention.

FIGS. 3A, 3B, 3C, and 3D are screen shots illustrating inside a merchant store front in accordance with an embodiment of the present invention. As illustrated in FIG. 3A, a screen shot illustrating inside a merchant store front in accordance with an embodiment of the present invention, when clicking the store front, the user may be directed to the virtual reality enhanced portions 70 of the merchants actual website 54. The user will be linked directly to the merchant's actual website rather than driven through a search engine, which may also be an option for the user. As such, a new browser is not required to enter into the merchant's website. Alternatively, the user may be directed to another web server, not part of the merchant's standard website, where the store is also presented in a 3D virtual reality world.

Once in the store, offers may appear either as a pop-up screen, on the tool bar 60, or presented by a customer service representative of the store. Offers may also be presented at the store front 52 as illustrated in FIG. 2A. When the user clicks on the offer, details of the offer are presented to the user. The offers may present special displays of products and promotions that cater to the desires of the customer. For example, it may contain merchandise that affords the frequent flyer miles specifically sought by the customer.

The offer above may be combined with product pricing information to optimize the shoppers needs. For example, the user may want to buy a certain product to obtain frequent flyer miles. A cost tradeoff between the product price and the rewards earned may be presented to the user to provide for a more informed shopping experience.

Additionally, the customer may also specify a preference for products from a certain manufacturer and is willing to pay slightly more for the product. This may be achieved through conversing with a customer service representative or concierge as described below.

3D Virtual Reality Review of Products

Figure 3B:
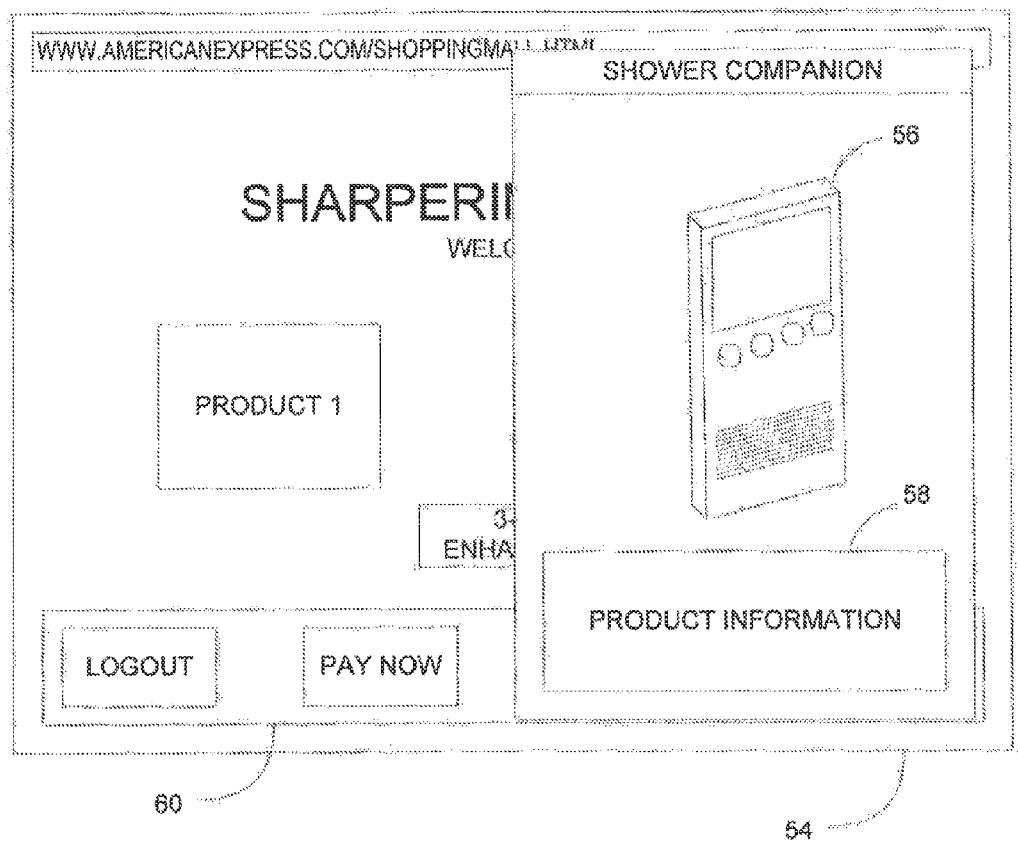
Figure 3C:
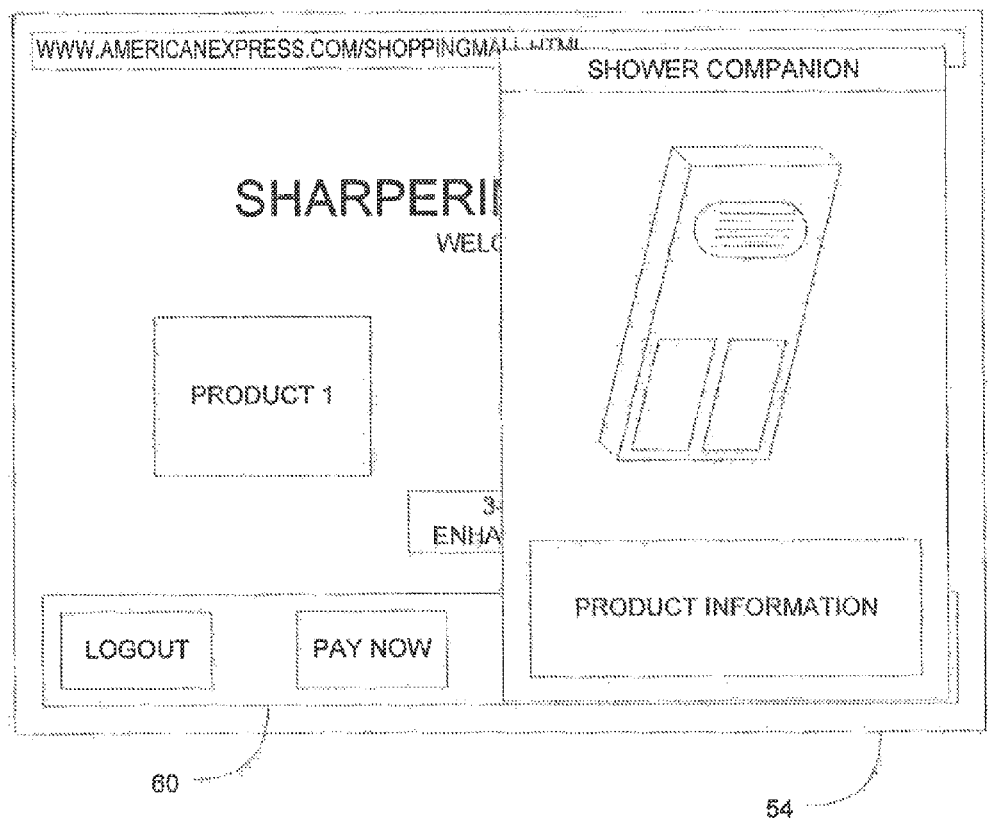
Figure 3D:
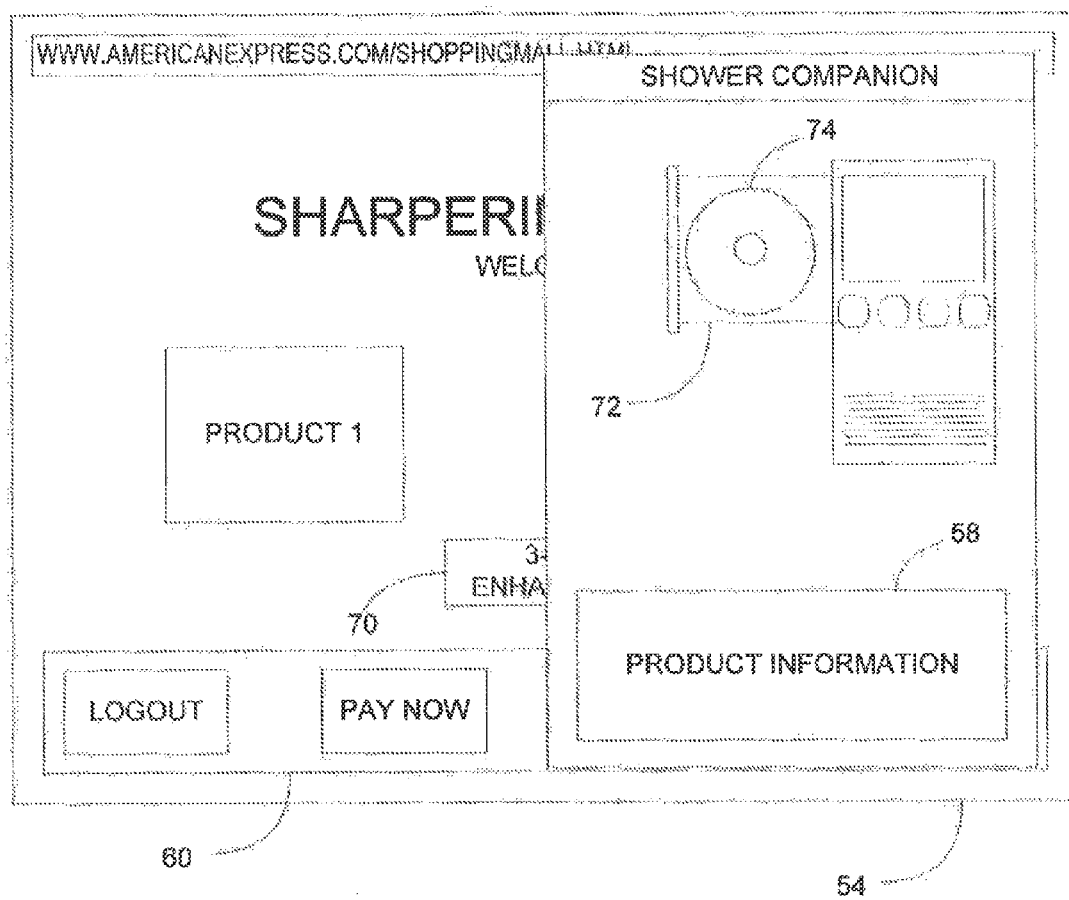

When the user locates a product he would potentially like to purchase, he may view the product in a 3D interactive virtual reality manner as if at the store and viewing the product. As illustrated in FIG. 3B, the product, a shower companion 56, is shown on a separate screen. As illustrated in FIG. 3C, the user may interactively rotate the product in any and all possible 360 degree rotations, zoom in and out, and interact with the merchandise in a life-like manner. As illustrated in FIG. 3D, the interaction may include the operation of movable parts and the generation of sounds, such as the opening and closing of the compact disc (CD) player 72, insertion of a CD 74, playing virtual CDs, and playing the AM and FM radio stations, all in 3D view.

Information about the product 58 may also be provided such as where the product was made, special features of the product, ingredients (if the product is food), and the like.

The user may also comparison shop by comparing different merchandise through the use of various different ways. One way may be the use of a comparison shopping expert, similar to the concierge discussed below. The comparison shopping expert may provide price comparisons of similar or the same product, alternative products, and the like. Another way to comparison shop may be the use of a special store front in the mall. Yet another way may be the use of a context sensitive comparison shopping software which will review the user's shopping cart and offer alternative suggestions of where to find better prices or alternative merchandise, either using customized user preferences or clickstream data as discussed below.

Universal Shopping Cart and Single Transaction Checkout

When the user wants to purchase an item, the product may be placed in a virtual shopping cart. Currently, consumers must purchase and check out products from each individual merchant's website. In other words, current shopping carts operate within the E-commerce infrastructure of a single website. Consumers are not able to shop different websites and purchase all products in a single transaction.

The present invention allows a consumer to shop various different stores within the mall without having to check out of each store and without the loss of the contents in the shopping cart. The user will be able to seamlessly visit one commerce site to another with the same shopping cart. This allows the consumer to be aware of the total purchase price and of all the products he would like to purchase. Furthermore, this allows the consumer to comparison shop before actually purchasing a product thereby saving the user the hassle of having to return unwanted merchandise.

Once the user has completed shopping, the user may engage in a single checkout transaction. The user is able to purchase all products in the universal shopping cart in one transaction that may contain merchandise from a variety of retailers.

Universal Tracking of Purchase

Once purchased, the products must be shipped to the user. Similar to the single transaction checkout discussed above, all products may be shipped to the user with one tracking number and/or in one shipment. A shipping database may be used to reference entries in the disparate databases of participating merchants and shippers. Alternatively, a master database may be used to store the actual data from the participating merchants. In either embodiment, XML, HTML, or other data interchange mechanisms may be employed to exchange data in an interpretable format. In another embodiment, the user may utilize the services of a shipper having a store front in the mall. This will provide for ease of shopping for the user by requiring the user to track only one shipment and/or tracking number rather than several shipments from several merchants.

The consumer may want to purchase products from a merchant located outside the United States. The present invention may assist the user in international purchases such as in getting tariffs paid, support for currency exchange, and the like. This may be through the use of the concierge, as further described below, through the use of a special international store front, or perhaps through an embassy that can provide any assistance required by the user. Furthermore, these services may be provided for a fee to the consumer.

Concierge

Figure 4A:
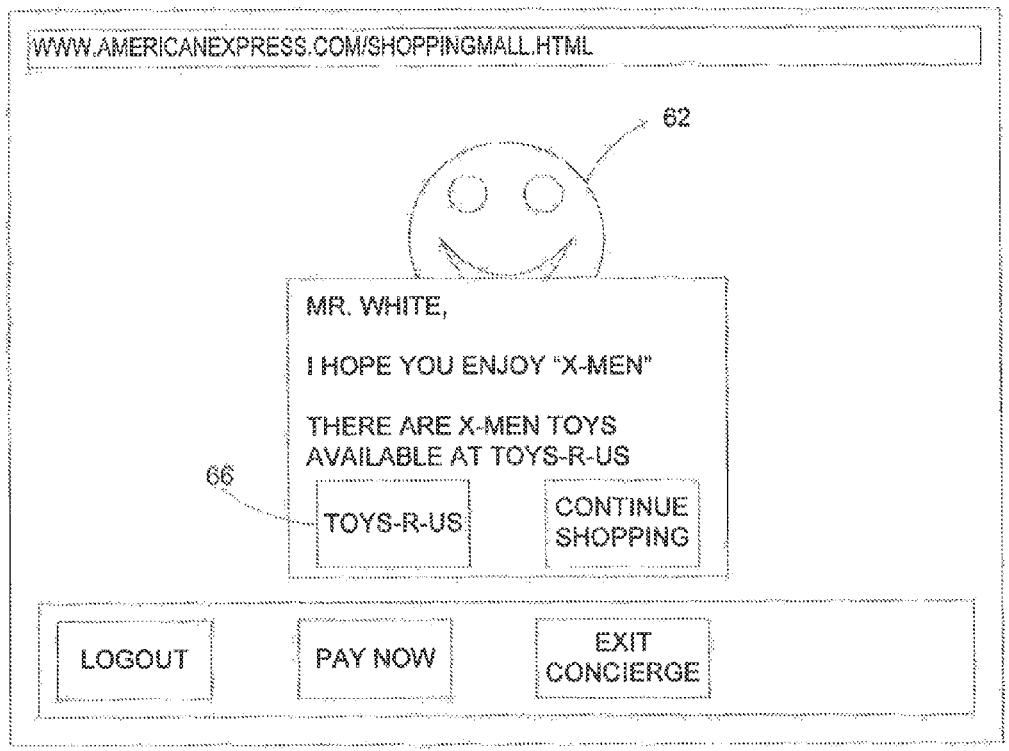
FIGS. 4A and 4B are screen shots illustrating the concierge in accordance with an embodiment of the present invention.
Figure 4B:
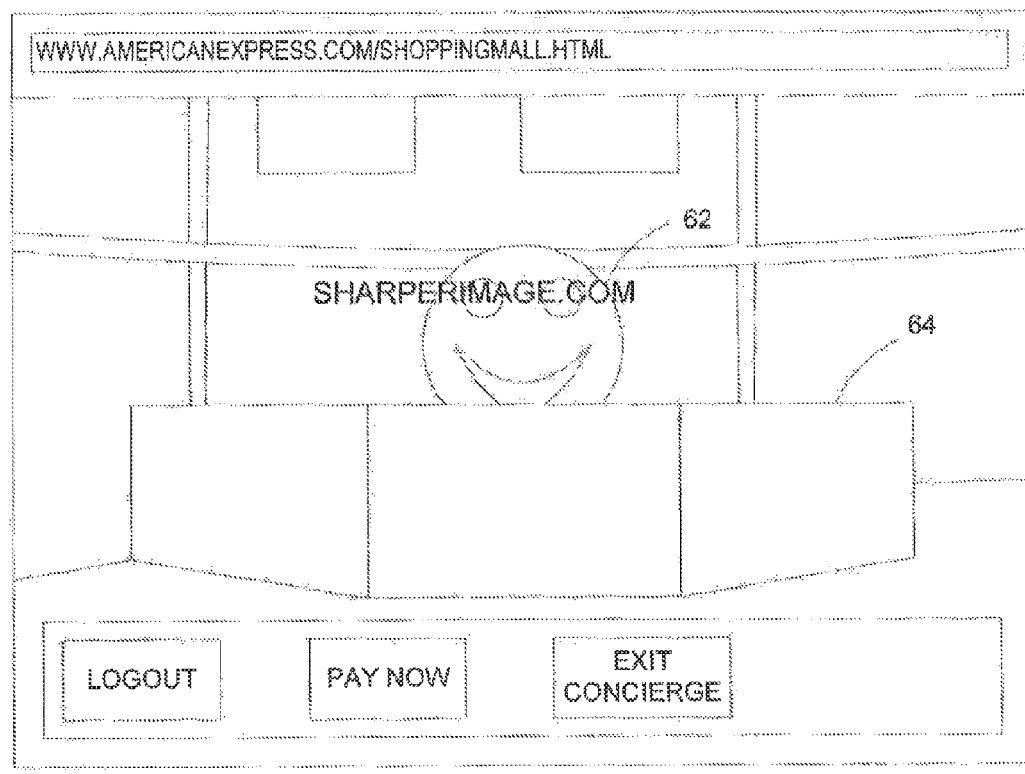

FIGS. 4A and 4B are screen shots illustrating the concierge in accordance with an embodiment of the present invention. A concierge 62 may be present to assist the user with the virtual shopping experience. The concierge 62 may be present in any form such as a human, or the robot as illustrated in FIGS. 4A and 4B. The concierge 62 may be used to assist the user in shopping through the mall, help find merchandise, help find a store, and the like. The concierge may use any or all the virtual reality elements may be used to effect the help experience such as speech simulation, speech recognition, text, and the like.

The concierge may also be used as an opportunity to promote merchandise. For example, the concierge may be a celebrity to promote a certain movie or a concert. The concierge may also be a character from films or advertisements or promote the film or certain merchandise.

The concierge may be positioned behind a desk 64 and called upon by clicking on the concierge. In an alternative, the concierge may have its own store front or an icon on the tool bar.

Personalized Mall

The user may personalize the mall to the user's desires. For example, the user may place certain stores in a "favorite stores" category and may call up the list at any time by clicking the appropriate icon on the tool bar. In another alternative, the list of favorite stores may be kept by the concierge and the concierge may present the stores as a list or as a demo show. The user's favorite stores may be inputted into the database through any means such as drag and drop from the directory or the favorite stores icon may be clicked when the user is in the store. This will allow the user to customize the mall that will allow for a more efficient and enhanced shopping experience.

Social Mall

People enjoy shopping in groups. In an embodiment of the present invention, the mall may emulate the social aspects of shopping. People often attract other people, so visual and audio feedback may be used to emulate social shopping. In one embodiment, people may be "linked up" in the vehicle while driving to the mall or at the mall. When linked up, the customers may be able to view each other, view each other's shopping carts, traverse the mall together, and communicate with each other through audio feedback. Although link up is not required for the experience of social shopping, linking up with other people will allow them to see the same stores, merchandise, shopping carts, and the like.

Chat rooms may also be used to enhance the social shopping experience. The chat room may be used for users to engage one another in conversations. However, the chat rooms may also be used as a gathering place for people to collectively listen to music or watch movies. The chat room may be complete with a media player, CD player, DVD player, and the like. The chat room may also provide for interactive sessions wherein the users may paint together, make music together, and the like.

Cross-Selling Via Animated Automation

Through a variety of means, such as through the concierge 62, pop-up screens, a floating bit map, or similar graphical entity which interacts with the user, a dialog may automatically be presented to the shopper offering shopping tips, information about similar products, features, special product offers, and whatever else may be deemed of interest to the customer. This provides for cross-selling opportunities of similar products or offers. For example, if a user is interested in children's video, the automated dialog may offer promotions for other children videos, inform the user of other stores which sell children videos, inform the user of lower priced videos at other stores, and the like. In another example as illustrated in FIG. 4A, a customer that purchases movie tickets to the X-Men movie may be interested in knowing that X-Men action figures are for sale in a particular store 66.

The automated dialog may include 3D virtual rotation and translation of the automation itself as it moves through the areas of the virtual mall with the user. The automated offers, tips, and the like may be presented to the user based upon the user's behavior through the mall, products in the user's shopping cart, and the like.

The ability to automate the dialog based upon the user's behavior through the mall may be achieved through virtual reality clickstream. The collection of semantically meaningful data that identifies the user actions with the virtual worlds is necessary to determine which products may be of interest to the user. Unique identifiers are used to identify the customer, their shopping sessions, and the various objects they encounter during the shopping session. The virtual reality clickstream will be a time series of data points comprised of the unique identifiers, including identifications of specific interactions with the user. The clickstream data may then be fed to a software module that controls the automation behavior, which is designed to increase product sales. The clickstream data may also be sent to the merchant website, upon request by the merchant, to allow the merchants to internally dynamically target and cross-sell products through changing their banner, store front, offers, customize sorting of their products, and the like.

Shopping Games

In an embodiment of the present invention, the psychological rewards of playing games may be applied to the business processes associated with shopping for both shoppers and non-shoppers. Rewards, such as money, merchant credits, frequent flyer rewards, and the like may be offered in shopping games. Video and computer game enthusiasts are so compelled to play games that they tend to spend tremendous amounts of time and money in their pursuit. The psychology of gaming is such that small incremental rewards provide positive feedback to continue the experience.

Rewards offered by games within the virtual mall may be achieved in many ways. For example, a virtual arcade will allow a gamer to select from a variety of games to play, which may be supported through payments in a variety of ways. Game tokens for a "free play" in the virtual arcade may be dispensed by merchants as offers or games and the virtual arcade can be used for promotions to purchase products in a merchant's store.

Alternatively, the shopper or non-shopper may engage in a treasure hunt throughout the mal. The user may try to locate the treasures, such as Easter eggs, or an object (such as a centurion), which may include offers or rewards within the treasures.

Virtual Reality Shopping Example

Figure 5:
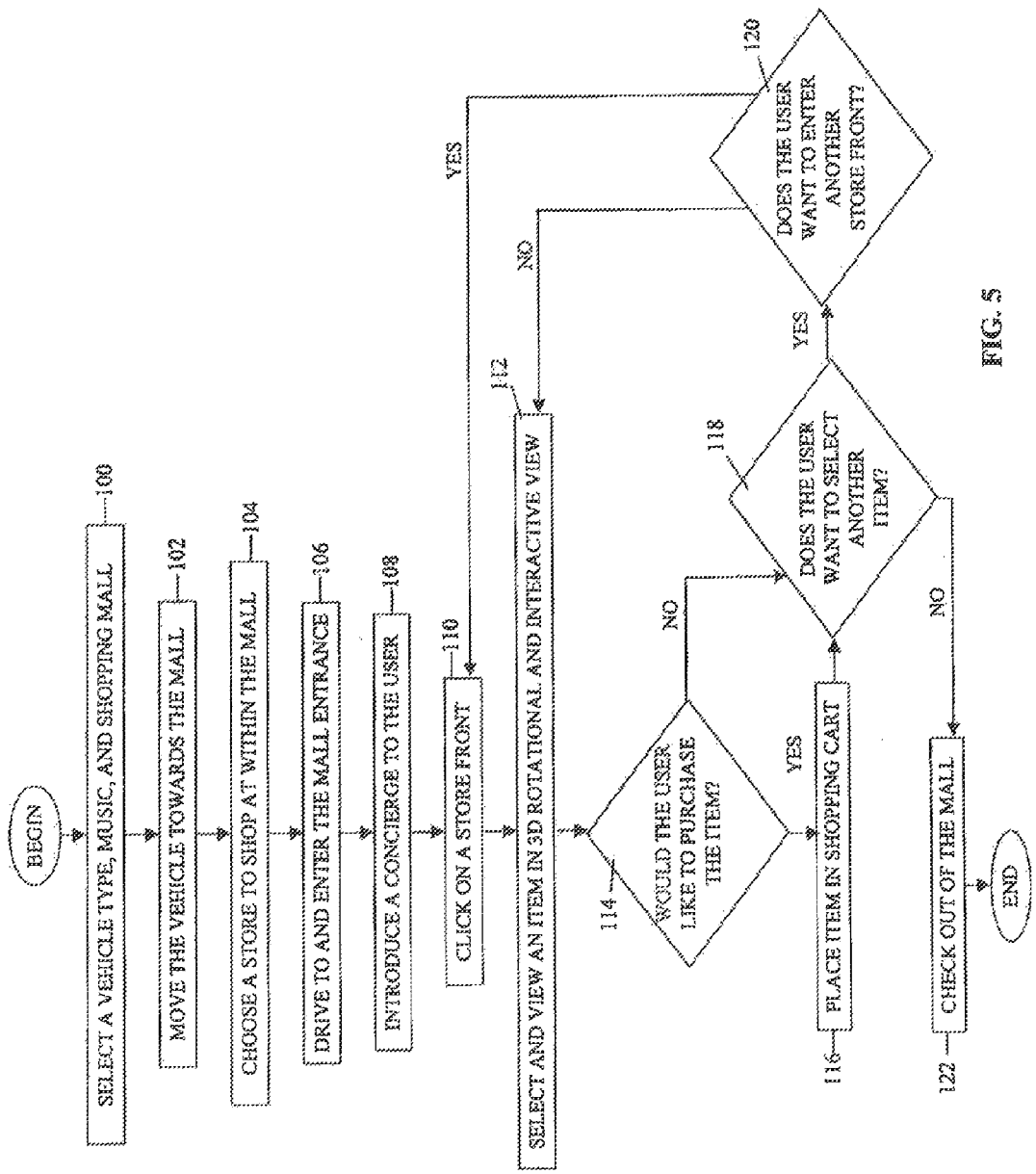
FIG. 5 is a flow diagram illustrating a method for a virtual reality shopping experience in accordance with an embodiment of the present invention.

The following is an example of a customer's virtual reality shopping experience. The example is for exemplary purposes only and is not intended to be limiting since each customer's experience will vary. FIG. 5 is a flow diagram illustrating a method for a virtual reality shopping experience in accordance with an embodiment of the present invention.

1. The user selects a vehicle type, music to play during the drive to the mall, and the shopping mall at 100. The user is then positioned in the vehicle.

2. The vehicle moves toward the mall at 102. The user is looking over the dashboard of the car and out the front windshield as the mall is moving toward the user.

3. The vehicle arrives at a crossroads, with the mall in the background, having signs to direct the user to various stores.

4. The user picks a store at 104 and the vehicle drives to the entrance of the mall.

5. The user exits the vehicle, locks the vehicle door, walks to the mall, and enters the mall at 106.

6. The user views a typical mall with store fronts, directory, escalator, and the like to emulate an actual shopping experience.

7. A concierge introduces himself to the user at 108 to assist the user with directions, information, and the like.

8. The user walks through the mall and views store fronts, which the merchants manage, with offers, messages, and the like.

9. The user may click on the store front at 110 and be directed to the virtual reality portion of the merchant's website.

10. The user may select an item to view, view the item in 3D rotational view, and interact with the product such as opening and closing draws, and the like at 112.

11. If the user would like to purchase the item at 114, the item is placed into the virtual shopping cart at 116. If not, the user may select another product at 118, at the same or different store at 120, or check out at 122.

12. The user may continue to shop throughout the mall at various merchant's store fronts. The user may also request price comparisons, product comparisons, merchant offers and the like.

13. Automated product cross-selling opportunities may be presented to the user from the concierge or pop-up screens. Additionally, rewards from games or treasure hunts throughout the mall may also be presented to the user.

14. As the user navigates through the mall, the user may customize the mall to his desires.

15. Once the user completes his shopping, he may check out of the mall 122 and purchase all the items in the shopping cart with a single transaction checkout without having to check out of each merchant's storefront individually.

Figure 6:
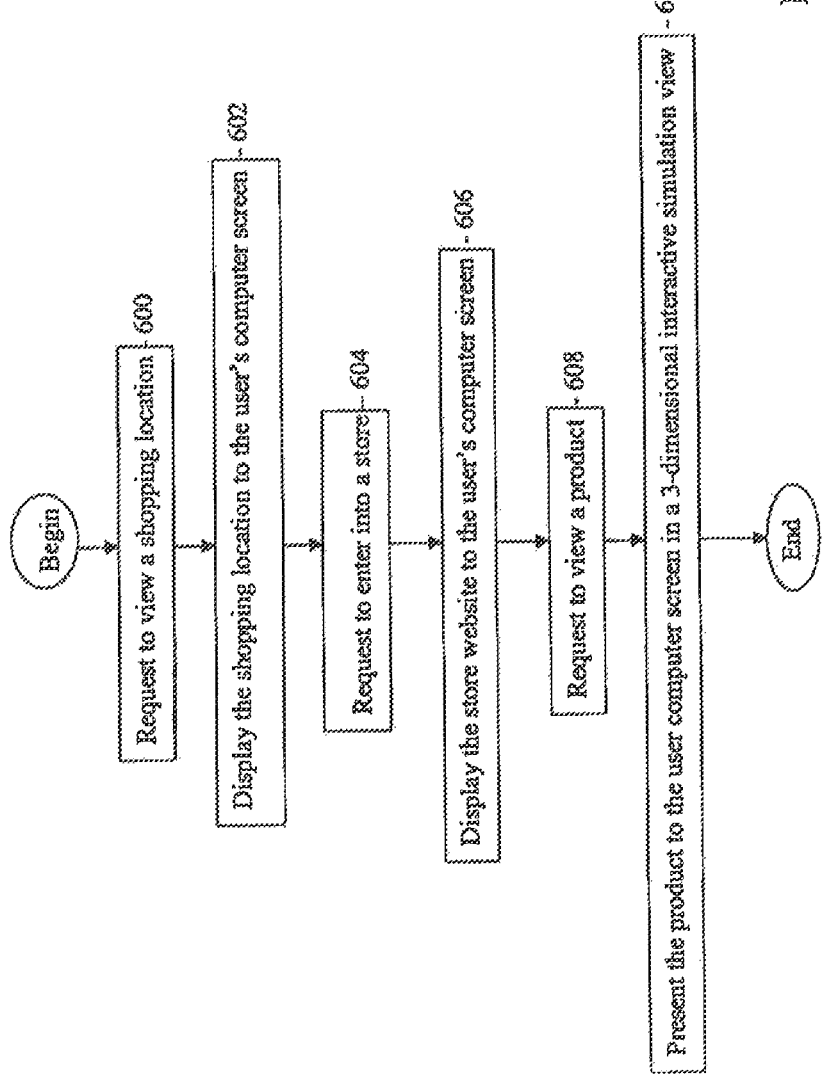
FIG. 6 illustrates a flow diagram illustrating a method for a virtual reality shopping experience in accordance with an alternative embodiment of the present invention.

FIG. 6 illustrates a flow diagram illustrating a method for a virtual reality shopping experience in accordance with an alternative embodiment of the present invention. A shopping server may receive a request to view a shopping location at 600. The shopping location, having at least one store, may be displayed to the user computer screen in a 3-dimensional interactive simulation view via a web browser to emulate a real-life shopping experience for the user at 602. A request may be obtained to enter into one of the stores at 604. The store website may then be displayed to the user computer screen in the same web browser at 606. The store website may have one or more enhanced virtual reality features to allow the user to view the merchandise in a virtual reality setting. A request may be made to view at least one product at 608 and the product may be presented to the user computer screen in a 3-dimensional interactive simulation view to emulate a real-life viewing of the product at 610.

Figure 7:
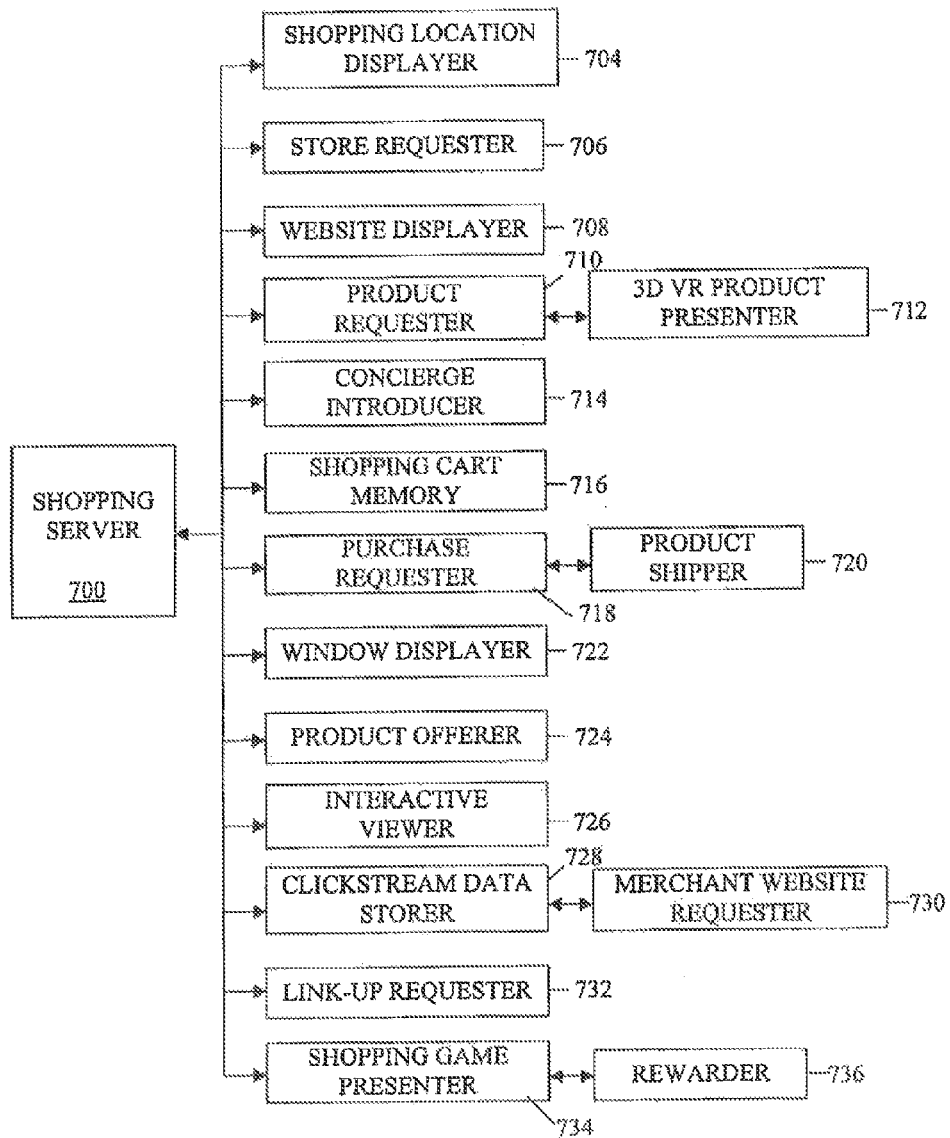
FIG. 7 illustrates a block diagram in accordance with another embodiment of the present invention.

FIG. 7 illustrates a block diagram in accordance with another embodiment of the present invention. A user computer may be connected to a shopping server 700 via the Internet or any method described above. A shopping location displayer 704 displays a shopping location, having at least one store, to the user computer in a 3-dimensional interactive simulation view via a web browser to emulate a real-life shopping experience for the user.

A store requester 706 receives requests to enter into any of the stores within the shopping location. A website displayer 708 may then display the store's website to the user computer in the same web browser, the store website having one or more enhanced virtual reality features to enable to user to view merchandise in a 3D virtual reality interactive manner.

A product requester 710 receives requests to view products from the user, which are presented to the user computer by a product presenter 712. The product presenter 712 presents the products in a 3-dimensional interactive simulation view to emulate a real-life viewing of the products.

The shopping server may have a concierge introducer 714 to introduce a concierge to the user and provide shopping assistance, information, tips, and the like to the user while the user is shopping through the mall. A shopping cart memory 716 may be used to store products or merchandise that the user wants to purchase.

When the user has completed his shopping and is ready to check out of the mall, a purchase requester 718 may receive a request to purchase the products in the virtual shopping cart, whereby the products may be from a variety of different stores. A product shipper may ship the purchased products to the user using one tracking number and in one shipment.

To further enhance the customer's shopping experience, a window displayer 722 may display products in a store window to emulate real-life window shopping. A product offerer 724 may display offers to emulate real-life sales advertising. A customer representative, similar to the concierge, may be present in the store to assist the user in real-time purchasing of products and if the customer any questions. An interactive viewer 726 may be used to allow the user to view a 360 degree virtual reality interactive view of the products. A clickstream data storer 728 may be used to store data of the user's actions within the 3D virtual reality setting to provide for automated cross-selling opportunities, offers, and the like as described above in detail.

To provide additional entertainment, a link-up requester 732 may be used to allow customers to shop in groups with friends, family, and the like. Additionally, a shopping game presenter 734 may present games to the user and a rewarder 736 may provide rewards, such as money, merchant credits, frequent flyer rewards, and the like, if the user wins the shopping game.

While embodiments and applications of this invention have been shown and described, it would be apparent to those skilled in the art having the benefit of this disclosure that many more modifications than mentioned above are possible without departing from the inventive concepts herein. For example, the VR shopping experience may apply to other forms of shopping, such as real estate shopping. The merchant store fronts may be realtors and the mall database may include programmatically integrating information allowing users to navigate through and above neighborhoods. Thus, the user may be able to view items, such as undesirable structures around the property, that may not be possible in person. Additionally, information such as cultural, religious, educational, governmental entities, and meteorological profiles may also be available to the user. The user may also traverse each property including zooming in and out of each area of a home. The invention, therefore, is not to be restricted except in the spirit of the appended claims.

The invention claimed is:

1. A computer-implemented method comprising:
   presenting, by a computer-based shopping system for facilitating shopping, a display of a virtual shopping location for a user computer, wherein the virtual shopping location has a first store and a second store;
   presenting, by the shopping system and in a web browser, an actual store website of the first store for the user computer, in response to a first request to enter into the first store, wherein the actual store website of the first store is linked to the virtual shopping location, and is independently managed by the first store; and
   presenting, by the shopping system and in the web browser, an actual store website of the second store for the user computer, in response to a second request to enter into the second store, wherein the actual store website of the second store is linked to the virtual shopping location, and is independently managed by the second store.

2. The method of claim 1, wherein the streaming is in a three-dimensional (3D) interactive simulation view via a web browser.

3. The method of claim 1, further comprising receiving, by the shopping system, a request to purchase items from the actual store website of at least one of the first store and the second store, wherein the items were inserted in a virtual shopping cart memory of the shopping system.

4. The method of claim 1, further comprising providing, by the shopping system, a virtual concierge in the virtual shopping location, the virtual concierge being linked to a concierge database which is connected to the shopping system.

5. The method of claim 1, wherein the actual store website has enhanced virtual reality (VR) features relating to senses of at least one of smell and touch.

6. The method of claim 1, wherein the streaming of the display of the virtual shopping location includes displaying an item offer to emulate real-life sales advertising.

7. The method of claim 1, wherein the presenting of the actual store website of the first store includes presenting a display of a customer representative to assist in real-time selecting of an item from the actual store website of the first store.

8. The method of claim 1, further comprising receiving, by the shopping system, a request to view an item from the actual store website of the first store, and presenting, by the shopping system, the item from the actual store website of the first store in a 3D interactive simulation view to emulate a real life viewing of the item.

9. The method of claim 8, wherein the presenting of the item includes causing a display of an item information sheet received from an item information database.

10. The method of claim 8, wherein the item from the actual store website of the first store is a real estate property, and wherein the presenting includes displaying cultural, religious, educational, governmental, and meteorological information relating to the real estate property.

11. The method of claim 1, further comprising receiving, by the shopping system, a request for a price comparison, an item comparison, or a merchant offer.

12. The method of claim 1, further comprising retrieving, by the shopping system, information data from an item comparison database and displaying the information data.

13. The method of claim 1, further comprising storing, by the shopping system, clickstream data of actions of the user computer within a 3D VR setting in a clickstream database.

14. The method of claim 13, further comprising receiving, by the shopping system, a request from a merchant website to obtain the clickstream data.

15. The method of claim 13, further comprising automatically displaying, by the shopping system, at least one of item cross-selling information, item offers, and information based upon the stored clickstream data.

16. The method of claim 1, further comprising receiving, by the shopping system, a request at the shopping system to personalize the virtual shopping location.

17. The method of claim 1, further comprising receiving, by the shopping system, a request at the shopping system to link-up with another user.

18. The method of claim 1, further comprising presenting, by the shopping system, a shopping game for the user computer.

19. An article of manufacture including a non-transitory, tangible computer-readable storage medium having instructions stored thereon that, in response to execution by a computer-based shopping system for facilitating shopping, cause the computer-based system to perform operations comprising:
- presenting, by the shopping system, a display of a virtual shopping location for a user computer, wherein the virtual shopping location has a first store and a second store;
- presenting, by the shopping system and in a web browser, an actual store website of the first store for the user computer, in response to a first request to enter into the first store, wherein the actual store website of the first store is linked to the virtual shopping location, and is independently managed by the first store; and
- presenting, by the shopping system and in the web browser, an actual store website of the second store for the user computer, in response to a second request to enter into the second store, wherein the actual store website of the second store is linked to the virtual shopping location, and is independently managed by the second store.

20. A system comprising:
- a processor for facilitating shopping,
- a tangible, non-transitory memory configured to communicate with the processor,
- a first presentation module configured to communicate with the processor and to display a virtual shopping location for a user computer, wherein the virtual shopping location has a first store and a second store;
- a second presentation module configured to communicate with the processor and to present, in a web browser, an actual store website of the first store for the user computer, in response to a first request to enter into the first store, wherein the actual store website of the first store is linked to the virtual shopping location, and is independently managed by the first store; and
- the second presentation module further configured to present, in the web browser, an actual store website of the second store for the user computer, in response to a second request to enter into the second store, wherein the actual store website of the second store is linked to the virtual shopping location, and is independently managed by the second store.

* * * * *